CONTRAST CONTROL CIRCUIT FOR A TELEVISION RECEIVER

Filed March 24, 1966

INVENTOR.
PETER J. H. JANSSEN

BY
Frank R. Jifani
AGENT 3,440,343
CONTRAST CONTROL CIRCUIT FOR A TELEVISION RECEIVER

Peter Johannes Hubertus Janssen, Emmasingel, Eindhoven, Netherlands, assignor, by mesne assignments, to U.S. Philips Corporation, New York, N.Y., a corporation of Delaware Filed Mar. 24, 1966, Ser. No. 537,609
Claims priority, application Netherlands, Apr. 6, 1965, 6504351
Int. Cl. H04n 3/16, 5/58
U.S. Cl. 178—7.3 2 Claims

ABSTRACT OF THE DISCLOSURE

A direct coupled video output amplifier for a television receiver in which the diode detector is connected between the control grid of the output tube and a tapping of a contrast control potentiometer in the cathode circuit. The tapping is also connected to the cathode of an AGC tube to the anode of which flyback pulses are applied. The common control of the contrast bias of the output tube and the cathode potential of the AGC tube ensures that the black level of the video output signal remains substantially at a constant value throughout the contrast control range.

The invention relates to a circuit arrangement for contrast control in a television receiver, while the black level is kept substantially constant. The arrangement of the invention comprises a video output tube, between the control-grid and cathode of which there is arranged a video detector, for the detection of a negatively modulated television signal, which is D.C. connected in such a manner that the peaks of the synchronising pulses are negatively orientated. For contrast control the cathode lead of the video output tube includes a variable resistor and the video output tube is D.C. connected to an automatic gain control tube capable of conveying current only at the appearance of the peaks of the synchronising pulses. The circuit operates to maintain the black level of the video signal derived from the anode of the video output tube substantially constant upon changes of the contrast.

Such a circuit arrangement is known from FIG. 2 of United States patent specification No. 3,095,474. In this known arrangement the contrast is also controlled by varying the cathode resistance of the video output tube and the black level is kept constant in the following manner. By the variation of the said cathode resistance both the voltage at the anode and that at the cathode of the video output tube vary, but as is known in opposite senses. Since both the anode and the cathode are connected for direct currents through a potentiometer to the control-grid of the automatic gain control tube, it will be obvious that by correct proportioning of said potentiometer, at a given variation of the cathode resistance, the voltage at the control-grid of the automatic gain control tube does not vary or exhibit a variation in a positive and in a negative sense. It will furthermore be obvious that at will the automatic gain control-voltage may be caused to vary accordingly so that the contrast is varied, whereas the black level is not varied.

This method of adjusting requires, however, four additional resistors for the said potentiometer. Moreover, a separate voltage divider is required for providing a position value for the cathode voltage of the automatic gain control tube, since the control-grid thereof, which is connected for direct currents to the anode of the video output tube, must be negative with respect to the cathode. Moreover, this cathode voltage must be smoothed. All this requires additional resistors and a smoothing capacitor.

When using a circuit arrangement according to the invention all these additional parts can be avoided and this arrangement is characterized in that the cathode resistor of the video output tube is formed by the series combination of a potentiometer resistor provided with a variable tapping and a fixed resistor. The free end of the potentiometer is connected to the cathode of the video output tube, and the free end of the fixed resistor is connected to earth. The variable tapping of the potentiometer is connected on the one hand directly to the end of the video detector remote from the control-grid of the video output tube and on the other hand directly to the cathode of the automatic gain control tube, the control-grid of which is D.C. connected to earth, the sum of the potentiometer and the fixed resistor and the ratio between the two resistors are such that with a displacement of the tapping the black level of the output signal from the video output tube remains substantially constant.

It should be noted that from U.S. patent specification No. 2,820,093 a circuit arrangement is known in which the end of the detection network remote from the anode of the detector diode is also connected to a variable tapping of the cathode resistor of the video output tube. In this arrangement, however, the peaks of the synchronising pulses are kept at a constant level, not the black level.

A possible embodiment of a circuit arrangement according to the invention will be described with reference to the accompanying figures of which:

Figure 1:
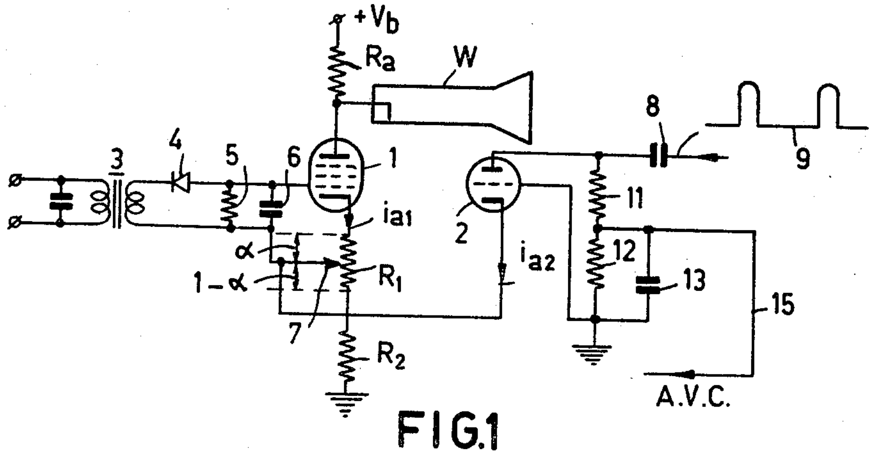
FIG. 1 shows the circuit arrangement proper.
Figure 2:
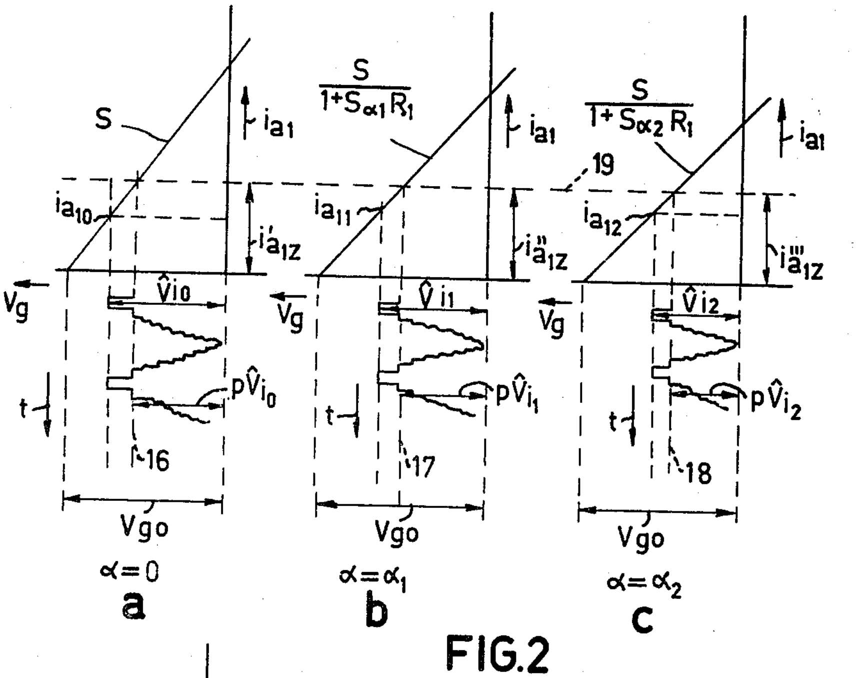
FIG. 2 shows the $i_a-V_g$ curves of the video output tube with video signals indicated therein.

In FIG. 1 the tube 1 represents the video output tube and the tube 2 is the automatic gain control tube of the television receiver. This receiver comprises a high-frequency portion (not shown) and an intermediate-frequency portion (not shown) of conventional form. The last I.F. transformer 3 is shown in FIG. 1. To the secondary winding of the transformer 3 is connected the video detector diode 4, the anode of which has connected to it a detection network formed by a resistor 5 and a capacitor 6, which network is connected to the end of the said secondary winding remote from the diode 4. The junction between this detection network and the secondary winding is also connected to a variable tapping 7 of a potentiometer resistor $R_1$. The resistor $R_1$ is connected in series with a fixed resistor $R_2$, and this series combination operates as a cathode resistor of the video output tube 1. The arrangement of FIG. 1 is intended for the reception of negatively modulated television signals. Therefore, subsequent to the detection of the television signal across the detection network 5, 6 a video signal $V_1$ is obtained in the grid space of the tube 1 as is indicated in FIG. 2. The video signal $V_1$ produces an anode current $i_{a1}$, which results in a voltage drop across the anode resistor $R_a$ of the tube 1. Through the resistor $R_a$ the anode of tube 1 is connected to a positive supply voltage $+V_b$. The voltage produced across the resistor $R_a$ is applied to the cathode of the display tube W, which can thus reproduce the television image.

In FIG. 1, it is assumed that the part of the potentiometer resistor $R_1$ between the variable tapping 7 and the cathode of the tube 1 has a resistance value of $\alpha R_1$ ohms and the part between the tapping 7 and the resistor $R_2$ a value of $(1-\alpha)R_1$ ohms, if the value of the resistor $R_1$ is $R_1$ ohms. The value $\alpha$ varies with the displacement of the tapping 7 so that it is a measure for the adjusted contrast. The anode current $i_{a1}$ of the tube 1 may be indicated by:

$$i_{a1}=\frac{S(V_i-V_{g0})}{1+S\alpha R_1} \qquad (1)$$

From the Equation 1 it follows that the signal $V_i$ is processed with an apparent mutual conductance $$\frac{S}{1+S\alpha R_1}$$

which apparent mutual conductance is smaller than the mutual conductance proper of the tube 1.

If the variable tapping 7 has been displaced to the end of the resistor $R_1$ connected to the cathode, $\alpha=0$ and the Equation 1 becomes 1′.

$$i_{a1}=S(V_i-V_{g0}) \qquad (1')$$

In this case the signal $V_i$ is processed with maximum mutual conductance S.

This is illustrated in FIG. 2*a*.

If the tapping 7 is displaced towards the resistor $R_2$ and if $\alpha$ assumes a value $\alpha_1$, the signal $V_i$ is worked with a mutual conductance of $$\frac{S}{1+S\alpha_1 R_1}$$

as is indicated in FIG. 2*b*. With a further displacement of the tapping 7 towards the resistor $R_2$, $\alpha$ becomes $\alpha_2$ and the apparent mutual conductance assumes a value $$\frac{S}{1+S\alpha_2 R_1}$$

which applies to FIG. 2*c*.

Since it applies that $$0<\alpha_1<\alpha_2<1,\ S>\frac{S}{1+S\alpha_1 R_1}>\frac{S}{1+S\alpha_2 R_1}>\frac{S}{1+SR_1}$$

wherein $$\frac{S}{1+SR_1}$$

is the minimum mutual conductance applying to $\alpha=1$, which is the state in which the tapping 7 is at the end of the resistor $R_1$, connected to the resistor $R_2$.

From the Equation 1 it follows that the anode current will always be equal to zero, if $V_i=V_{g0}$, irrespective of the value of $\alpha$. In other words $V_{g0}$ is the grid space charge of the tube 1 and therefore $V_i=V_{g0}$ the point about which the mutual conductance curve shown as a straight line will bend and assume the values indicated in FIG. 2.

According to the invention the tapping 7 is connected to the cathode of the automatic gain control tube 2. When the tapping 7 is displaced, not only the apparent mutual conductance with which the signal $\hat{V}_i$ is worked will vary, but also the amplitude $V_i$ of this video signal. This may be accounted for as follows.

The anode of the automatic gain control tube 2 receives through the capacitor 8, positive-going fly-back pulses 9. The control-grid of tube 2 is connected to earth so that during the appearance of the pulses 9 an anode current $i_{a2}$ will flow through tube 2, the intensity of which is determined by the instantaneous value of the cathode voltage $V_{k2}$ of the tube 2. This instantaneous value is determined by the peaks of the synchronising pulses of the video signal $\hat{V}_i$, since these pulses appear simultaneously with the pulses 9. The anode current $i_{a2}$ produces across the resistor 11 and 12 a voltage drop which is smoothed by means of a smoothing capacitor 13. The resultant negative automatic-gain-control-voltage is applied through the conductor 15 to the I.F. and H.F. tubes to be controlled in the television receiver, whilst, if desired, the control of the H.F. part may be delayed.

As stated above the contrast is controlled by the displacement of the tapping 7. Since the tapping 7 is connected to the cathode of the tube 2, which is included in the automatic gain control-circuit and a control-circuit always tends to obviate the cause of its generation, the arrangement tends in this case to keep the cathode voltage $V_{k2}$ as constant as possible at a displacement of the tapping 7. When the tapping 7 is displaced in downward direction (that is to say when $\alpha$ increases) the resistance part between the tapping 7 and earth is reduced. Should the voltage $V_{k2}$ remain substantially constant, this means that the current through said reduced resistance part must increase.

The current determined by the voltage $V_{k2}$ is only of importance during the appearance of the synchronising pulses, since only during this time the pulses 9 render the tube 2 conducting. It can furthermore be said that the anode current $i_{a2}$ of the tube 2 is negligibly low with respect to the current $i_{a1}$ of the tube 1. The peaks of the synchronising pulses exceed the cut-off voltage of the tube 2 only to a small extent, so that $i_{a2}$ has only a very low value. It may therefore be said that solely the anode current $i_{a1}$ (in fact also the screen-grid current $i_{g2}$ of the tube 1 has to be considered, but with a satisfactorily smoothed screen grid $i_{g2}$ is a constant current not having any effect upon these considerations) passing through the resistance part between the tapping 7 and earth, determines the cathode voltage $V_{k2}$.

This anode current $i_{a1}$ is determined by the distance between the peaks of the synchronising pulses and the voltage $V_{g0}$, at which the anode current is cut off. $\hat{V}_i$ designating the peaks of the synchronising pulses, this anode current is determined by $$i_{a1}=\frac{S(\hat{V}_i-V_{g0})}{1+S\alpha R_1} \qquad (2)$$

It is stated above that at a downward displacement of the tapping 7 ($\alpha$ is higher) the current $i_{a1}$ must increase and since when a signal is lacking the maximum anode current is operative (diode 4 does not supply a negative voltage), so that peak white lies proportionally at the same distance from the line $V_g=0$, this means that $\hat{V}_i$ must become lower. In FIG. 2*a*, where $\alpha=0$ the anode current $i_{a10}$ appearing at the peaks of the synchronising pulses will be determined by the peak value $\hat{V}_{i0}$; in FIG. 2*b*, in which $\alpha=\alpha_1$ the current $i_{a11}$ by the peak value $\hat{V}_{i1}$ and in FIG. 2*c*, in which $\alpha=\alpha_2$, the current $i_{a12}$ by the peak value $\hat{V}_{i2}$. Since it applies that 0> $_1$> $_2$, it appears from FIG. 2 that $$\hat{V}_{i0}>\hat{V}_{i1}>\hat{V}_{i2}$$

As stated in the preamble, however, the present invention has for its object to keep the black level constant during the contrast control. This is achieved, when the anode current $i_{a1}$ of the tube 1 invariable assumes the same value practically independently of the contrast control at the occurrence of the black level. In other words the anode current $i_{a1z}$ always has the same value at the black level which is given by $$p\hat{V}_{i0},\ p\hat{V}_{i1} \text{ and } p\hat{V}_{i2}$$

wherein $p$ is the percentage of modulation at which the black level is present in the not yet detected television signal, indicated in FIGS. 2*a*, 2*b* and 2*c* by the lines 16, 17 and 18 respectively. This means that $i_{a1'z}=i_{a1''z}=i_{a1'''z}$; these equal anode currents are indicated in FIG. 2 by the line 19. If there is always the same anode current at the black level, the voltage drop across the anode resistor $R_a$ at this level of the video signal will have the same value, and hence also the voltage at the cathode of the display tube W. As a result the background brightness of the picture reproduced by the tube W is always the same, independently of the contrast control.

The resistors $R_1$ and $R_2$ determine the proportioning of the arrangement at a given automatic gain control strength, which is determined by the negative voltage supplied by the tube 2 with the tubes or transistors controlled in the H.F. or I.F. stages. The required values of the resistors $R_1$ and $R_2$ can be found as follows.

The tapping 7 is displaced towards the junction of the potentiometer $R_1$ with the cathode of the tube 1 ($\alpha=0$). In this position of the tapping 7 the resistors $R_1$ and $R_2$ are chosen so that the desired value of $\hat{V}_{10}-V_{g0}$ is obtained, since this voltage value (see FIG. 2*a* where $\alpha=0$) determines the current $i_{a10}$. The voltage $V_{k2}$ is found from $i_{a10}$ $\{R_1+R_2\}$ and since $V_{k2}$ finally determines the automatic gain control voltage, the value $\hat{V}_{10}$ and hence that of $\hat{V}_{10}-V_{g0}$ are determined through the intensity of the automatic gain control. At the same time the place of the line 16 in FIG. 2*a* is fixed, since it is given by $p\hat{V}_{10}$, designating the value of the anode current $i'_{a1z}$ at the black level.

Then the tapping 7 is displaced completely towards the junction of the resistors $R_1$ and $R_2$ ($\alpha=1$). In this position of the tapping 7 $R_2$ must be chosen so that, the sum $R_1+R_2$ found from the first measurement remaining the same the anode current $a_{11z}$ again assumes the value indicated by the line 19.

It can then be assessed whether for the values of $\alpha$ between 0 and 1 also the anode current of the tube 1 at the black level approaches to the optimum the value indicated by the line 19.

Figure 3:
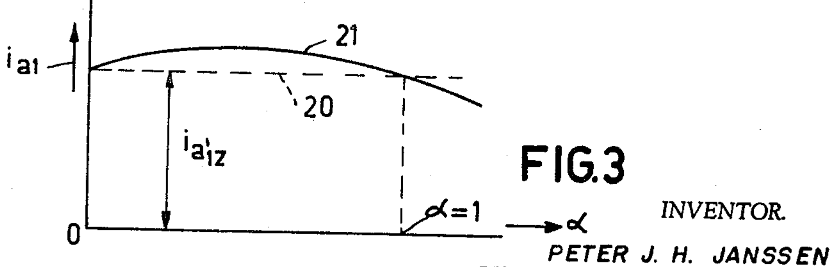
FIG. 3 shows the course of the anode current of the video output tube at the black level as a function of contrast control.

This is elucidated in FIG. 3, in which the anode current $i_{a1}$ is plotted as a function of $\alpha$. For $\alpha=0$, the anode current $i'_{a1z}$ at the black level is found in the manner described above; this is indicated in FIG. 3 by the line 20. This value is also adjusted for $\alpha=1$. Then the curve (which may assume for example the shape of the curve 21 in FIG. 3) is measured, which indicates the values of the anode current of the tube 1 at the black level. If the maximum difference thereof does not deviate excessively from the value indicated by the line 20 (for example the maximum difference between the curve 21 and the line 20 must be less than 5% of the value $i'_{a1z}$) the adjustment may be considered to be definite. If the maximum difference is too high, the adjustments are repeated for $\alpha=0$ and $\alpha=1$.

By this method the values of the resistors for a PCL 84 (pentode is the video output tube and the triode is the automatic gain control tube 2) were found to be:

$$R_1=300 \text{ ohms, } R_2=560 \text{ ohms}$$

Control was carried out on an I.F. tube of the type PCF 201 and one H.F. tube of the type PC 900 in the VHF-tuner with VHF reception or with UHF reception at the mixing tube of the type PCF 801 in the VHF tuner, operating as an I.F. amplifier.

It should be noted that although in the embodiment of FIG. 1 the control-grid of the automatic gain control tube is directly connected to earth, this control-grid may as an alternative be used for the supply of separated interference pulses being applied thereto through a capaci-connected through a resistor to earth, the separated interference pulses being applied thereto through a capacitor with a polarity cutting off the tube 2. It is thus achieved that any interference pulses still contained in the video signal $V_1$ cannot produce anode current in the tube 2.

It should finally be noted that it is not strictly necessary for the pulses 9 to be directly applied to the anode of the tube 2. A diode or a voltage-dependent resistor (VDR) may be connected between the capacitor 8 and the anode of the tube 2 and the anode through a comparatively large capacitor, which operates as a reservoir for tube 2.

I claim:

1. A contrast control circuit for a television receiver, said circuit comprising first and second amplifier devices having first and second input electrodes, first and second output electrodes, and first and second common electrodes, respectively, a source of operating potential having first and second terminals, output circuit means connected between said first output electrode and said second terminal, a resistor and a potentiometer having a movable tap serially connected in that order between said first terminal and first common electrode, input means for providing a video television signal modulated on a carrier wave, video television signal detection means coupled to said input means and connected between said tap and said first input electrode, means connecting said tap to said second common electrode, a source of flyback pulses, means applying said flyback pulses to one of said second input and output electrodes, and means for deriving an automatic gain control voltage from said second output electrode for controlling the amplitude of said modulated carrier wave at said input means whereby variation of the position of said tap varies the contrast of output signals in said output circuit without substantially varying the black level of said output signals.

2. A contrast control circuit for a television receiver, said circuit comprising first and second electron discharge devices having first and second cathodes, first and second control electrodes, and first and second anodes respectively, a source of operating voltage having first and second terminals, output circuit means connected between said first anode and second terminal, a fixed resistor and a potentiometer connected in series in that order between said first terminal and said first cathode, said potentiometer having a variable tap, input means for providing a video television signal modulated on a carrier wave, a video signal diode detector coupled to said input means and connected between said first control electrode and said tap whereby the synchronizing peaks of said video signal are negative peaks at said first control electrode, means connecting said tap directly to said second cathode, means connecting said second control electrode to said first terminal, a source of flyback pulses, means applying said flyback pulses to said second anode, and means deriving an automatic gain control voltage from said second anode for controlling the amplitude of said modulated carrier wave at said input means whereby variation of the position of said tap varies the contrast of output signals in said output circuit without substantially varying the black level of said output signals.

References Cited

UNITED STATES PATENTS

| | | | |
|---|---|---|---|
| 2,820,093 | 1/1958 | Berkhout et al. | 178—7.5 |
| 3,334,180 | 8/1967 | Loughlin | 178—7.5 |

ROBERT L. GRIFFIN, *Primary Examiner.*

R. L. RICHARDSON, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,440,343 April 22, 1969

Peter Johannes Hubertus Janssen

It is certified that error appears in the above identified patent and that said Letters Patent are hereby corrected as shown below:

In the heading to the printed specification, line 8, "537,609" should read -- 537,069 --. Column 4, line 45, "$0>1>2$" should read -- $0>\alpha_1>\alpha_2$ --.

Signed and sealed this 14th day of April 1970.

(SEAL)
Attest:

Edward M. Fletcher, Jr.
Attesting Officer

WILLIAM E. SCHUYLER, JR.
Commissioner of Patents